US012739851B2

(12) United States Patent
Maamari et al.

(10) Patent No.: US 12,739,851 B2
(45) Date of Patent: Sep. 15, 2026

(54) ENHANCEMENTS TO PDCCH SKIPPING WITH DUMMY GRANTS

(71) Applicant: QUALCOMM Incorporated, San Diego, CA (US)

(72) Inventors: Diana Maamari, San Diego, CA (US); Linhai He, San Diego, CA (US); Peter Pui Lok Ang, San Diego, CA (US); Huilin Xu, Temecula, CA (US); Prashanth Haridas Hande, San Diego, CA (US); Mickael Mondet, Louannec (FR); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 18/457,776

(22) Filed: Aug. 29, 2023

(65) Prior Publication Data

US 2024/0163898 A1 May 16, 2024

Related U.S. Application Data

(60) Provisional application No. 63/383,383, filed on Nov. 11, 2022.

(51) Int. Cl.

*H04W 72/232* (2023.01)
*H04L 1/1812* (2023.01)
*H04W 76/28* (2018.01)

(52) U.S. Cl.

CPC ......... *H04W 72/232* (2023.01); *H04L 1/1812* (2013.01); *H04W 76/28* (2018.02)

(58) Field of Classification Search

CPC .... H04W 72/232; H04W 76/28; H04L 1/188; H04L 1/1822

See application file for complete search history.

(56) References Cited

U.S. PATENT DOCUMENTS

2020/0059390 A1* 2/2020 Zhang .................. H04L 1/0007
2020/0351026 A1* 11/2020 Babaei ................. H04L 1/1835

(Continued)

OTHER PUBLICATIONS

CATT: "UE Power Saving Techniques for XR", 3GPP TSG RAN WG1 #110, R1-2206384, 3rd Generation Partnership Project, Mobile (3GPP), Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 17 Pages, XP052274316, p. 2-p. 3, Figure 1.

(Continued)

*Primary Examiner* — Andrew Lee

(74) *Attorney, Agent, or Firm* — Procopio, Cory, Hargreaves & Savitch LLP

(57) ABSTRACT

A method for wireless communication at a user equipment (UE) and related apparatus are provided. In the method, the UE receives downlink control information (DCI) indicating for the UE to skip physical downlink control channel (PDCCH) monitoring or to extend a connected discontinuous reception (CDRX) active time. The DCI includes one or more of a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size. The UE further skips transmission of hybrid automatic repeat request (HARQ) feedback for the DCI.

29 Claims, 13 Drawing Sheets

(56) References Cited

U.S. PATENT DOCUMENTS

| | | | | |
|---|---|---|---|---|
| 2020/0396684 | A1* | 12/2020 | Lin | H04W 52/0229 |
| 2021/0258107 | A1* | 8/2021 | Khoshnevisan | H04L 1/1614 |
| 2022/0322415 | A1* | 10/2022 | Wu | H04L 5/0033 |
| 2023/0063082 | A1* | 3/2023 | Zhou | H04L 1/1851 |
| 2023/0354328 | A1* | 11/2023 | Lee | H04L 5/0044 |
| 2024/0267931 | A1* | 8/2024 | Zhou | H04W 72/12 |
| 2024/0298334 | A1* | 9/2024 | Nimbalker | H04L 5/001 |
| 2025/0167933 | A1* | 5/2025 | Zhao | H04L 1/1614 |
| 2025/0227715 | A1* | 7/2025 | Xin | H04L 1/1812 |
| 2025/0261171 | A1* | 8/2025 | Li | H04W 52/0235 |
| 2025/0344153 | A1* | 11/2025 | Fu | H04W 76/28 |

OTHER PUBLICATIONS

International Search Report and Written Opinion—PCT/US2023/031559—ISA/EPO—Dec. 4, 2023.

Samsung (Kim Y): "Considerations on Power Savings for XR", 3GPP TSG RAN WG1 #111, R1-2212062, Type Discussion, FS_NR_XR_ENH, 3rd Generation Partnership Project (3GPP), Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 5 Pages, XP052222627, p. 1, p. 3-p. 4.

* cited by examiner

400
ON Duration
ON Duration
OFF Duration
OFF Duration
DRX Cycle
DRX Cycle
ON Duration 450
Jitter
Jitter
Non-Integer Cycle
XR Flow 1
402
t0
t1
XR Traffic Burst 1
404
XR Traffic Burst 2
406
Jitter
Jitter
Non-Integer Cycle
XR Flow 2
408

XR Traffic Burst
XR Traffic Burst

500

1000

ENHANCEMENTS TO PDCCH SKIPPING WITH DUMMY GRANTS

CROSS REFERENCE TO RELATED APPLICATION(S)

This application claims the benefit of and priority to U.S. Provisional Application Ser. No. 63/383,383, entitled “ENHANCEMENTS TO PDCCH SKIPPING WITH DUMMY GRANTS” and filed on Nov. 11, 2022, which is expressly incorporated by reference herein in its entirety.

TECHNICAL FIELD

The present disclosure relates generally to communication systems, and more particularly, to the enhancements to PDCCH skipping with dummy grants in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to receive downlink control information (DCI) indicating for the UE to skip physical downlink control channel (PDCCH) monitoring or to extend a connected discontinuous reception (CDRX) active time. The DCI may include one or more of a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size. The at least one processor may be further configured to skip the transmission of hybrid automatic repeat request (HARQ) feedback for the DCI.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to output DCI indicating for a UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The at least one processor may be further configured to communicate with the UE based on the DCI.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
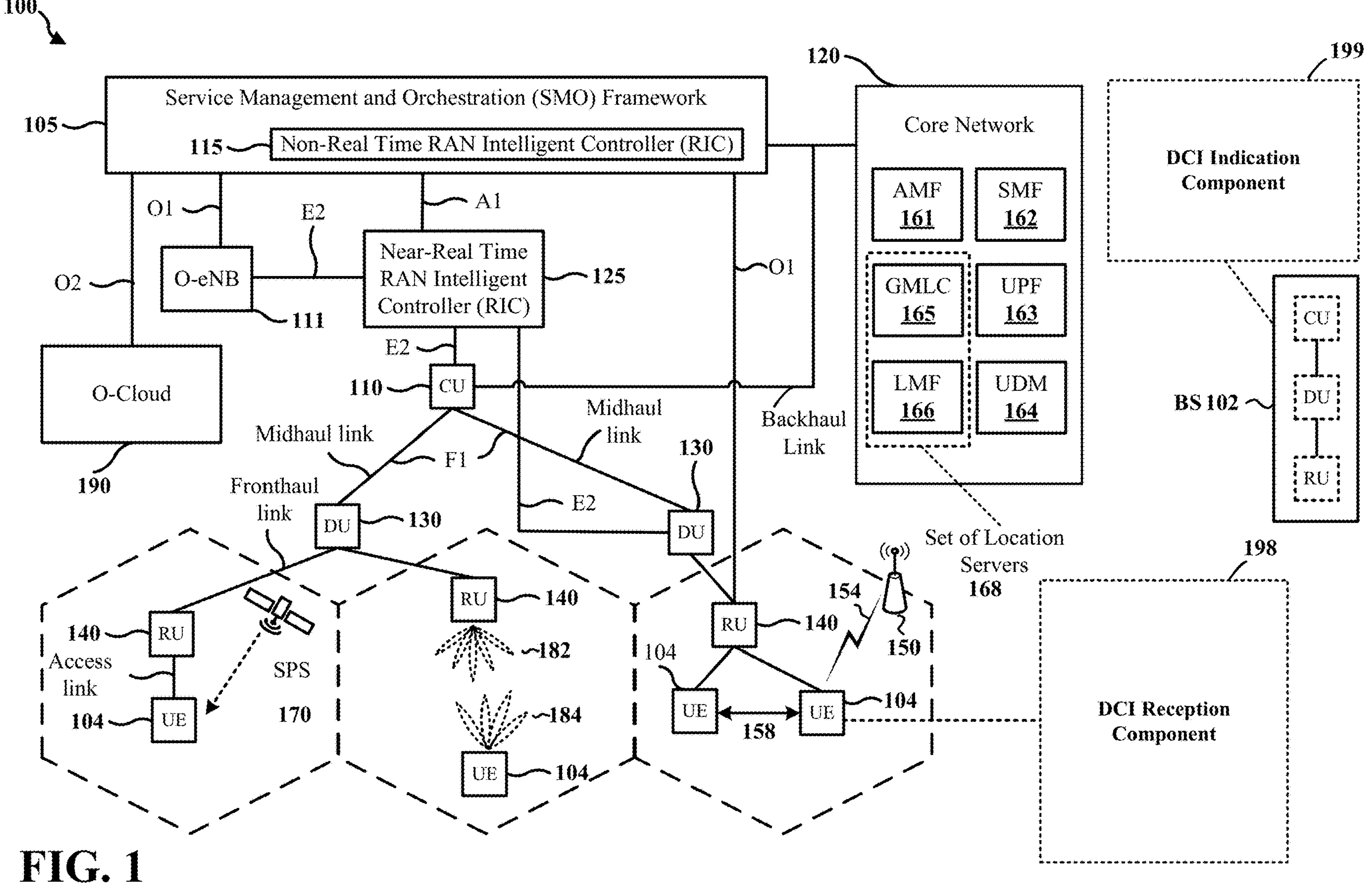
FIG. 1 is a diagram illustrating an example of a wireless communication system and an access network.

A UE may skip monitoring PDCCH for power-saving purposes. The indication to skip PDCCH monitoring may be sent to the UE through a scheduling DCI. However, a scheduling DCI may have limited flexibility and transmission resource to indicate the skipping of PDCCH monitoring because the scheduling DCI is used for scheduling data at the same time. Aspects presented herein include methods and apparatus to utilize dummy grants as non-scheduling DCI to enhance PDCCH skipping in wireless communication. As presented herein, in one aspect, a UE may receive DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The UE may further skip the transmission of HARQ feedback for the DCI.

Particular aspects of the subject matter described in this disclosure may be implemented to realize one or more of the following potential advantages. In some examples, by utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low-power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DCI reception component 198. The DCI reception component 198 may be configured to receive DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The DCI reception component 198 may be further configured to skip the transmission of HARQ feedback for the DCI. In certain aspects, the base station 102 may include a DCI indication component 199. The DCI indication component 199 may be configured to output DCI indicating for a UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The DCI indication component 199 may be further configured to communicate with the UE based on the DCI. Although the following description may be focused on 5G NR, the concepts described herein may be applicable to other similar areas, such as LTE, LTE-A, CDMA, GSM, and other wireless technologies.

Figures 2A, 2B, 2C, 2D:
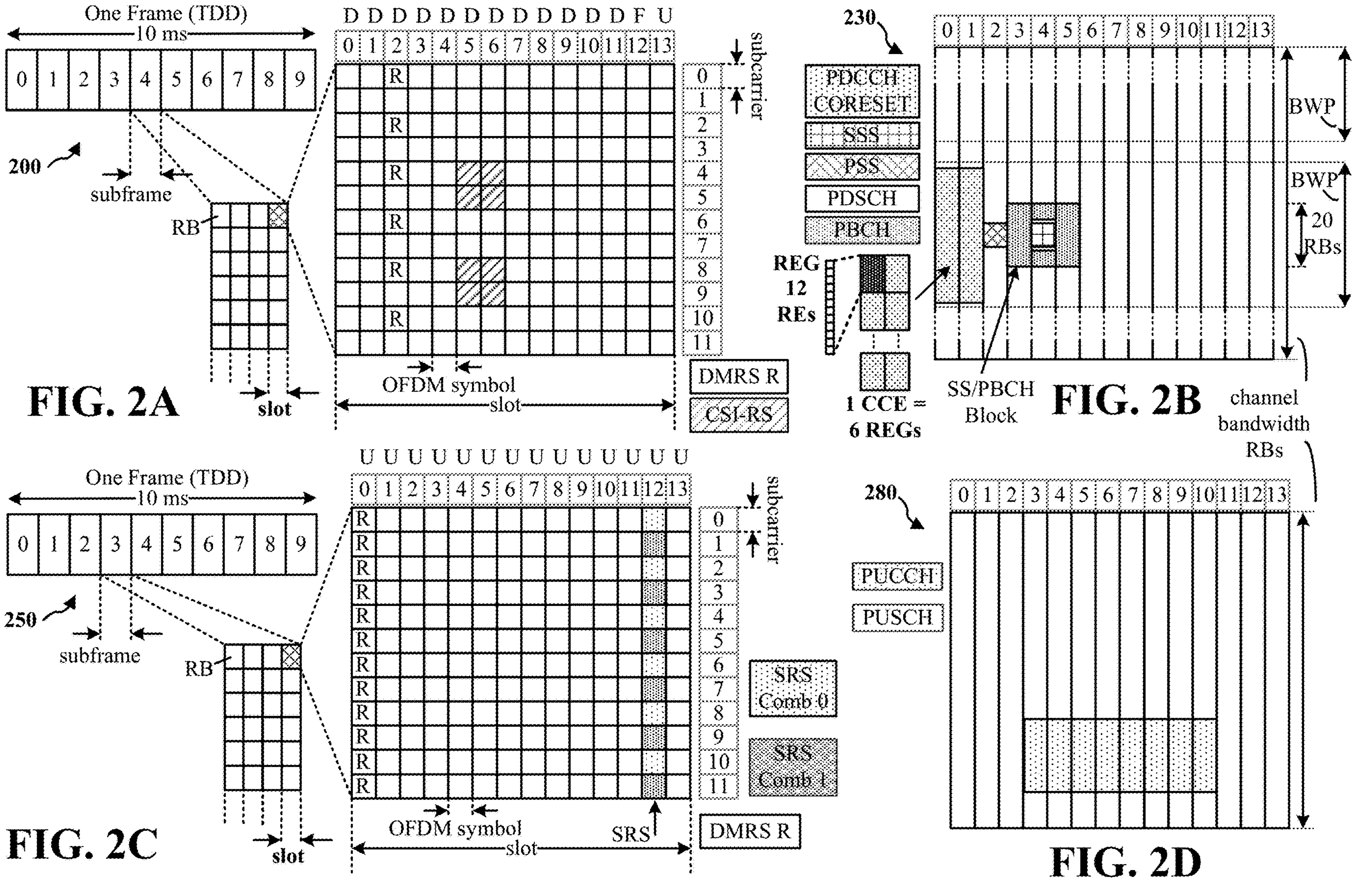
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2 slots/subframe. The subcarrier spacing may be equal to $2^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
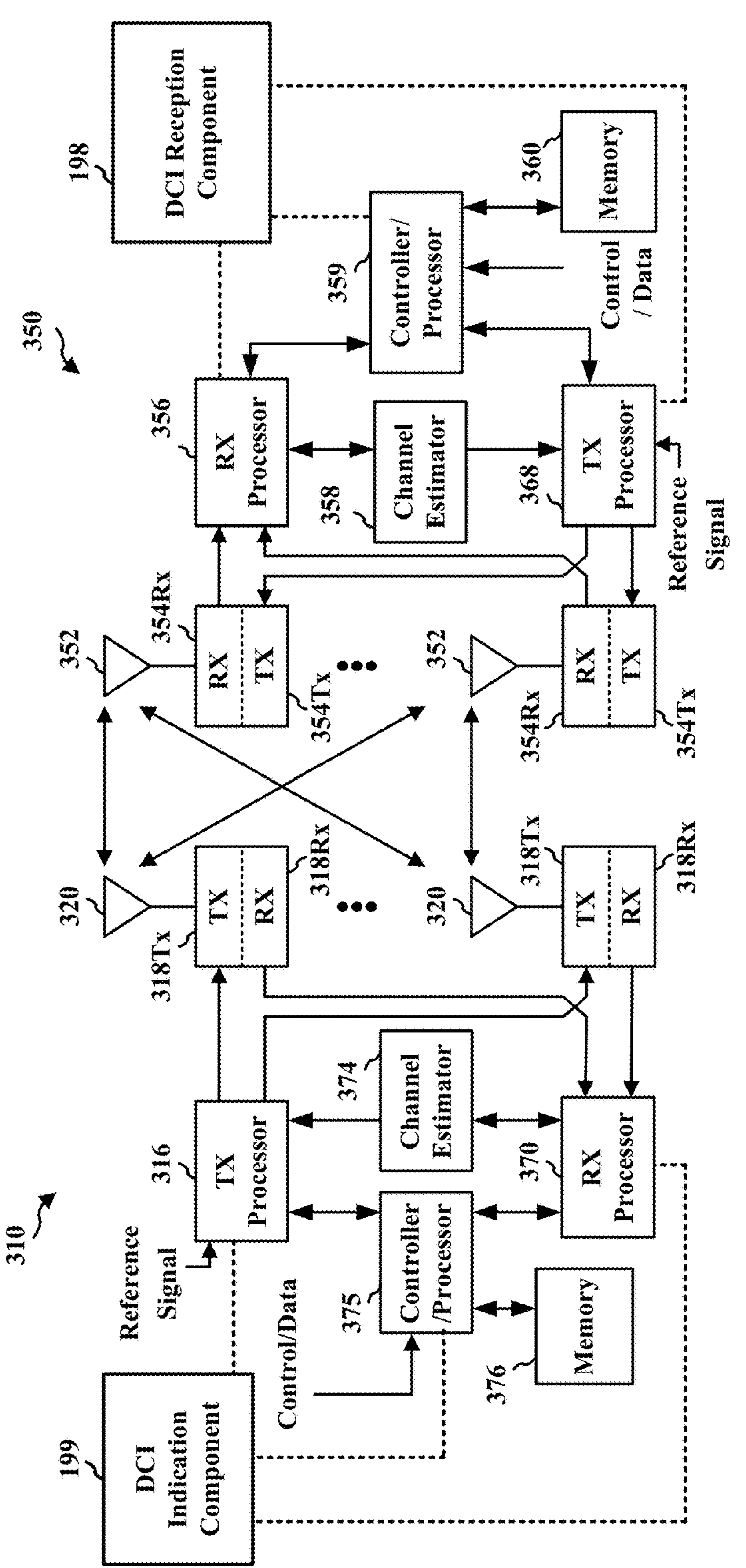
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DCI reception component 198 of FIG. 1.

At least one of the TX processor 316, the RX processor 370, and the controller/processor 375 may be configured to perform aspects in connection with the DCI indication component 199 of FIG. 1.

In RRC idle and inactive states, radio resource management (RRM) and paging procedures at the UE can consume significant amounts of UE power. In a DRX mode, for power-saving purposes, the UE may monitor a PDCCH channel discontinuously using a sleep and wake cycle, e.g., DRX OFF durations and DRX ON durations. When the UE is in an RRC-connected state, the DRX may also be referred to as Connected DRX (CDRX). If the UE is in an RRC idle state, the DRX may be referred to as IDRX. In a non-DRX mode, the UE monitors for PDCCH in each subframe to check whether there is downlink data available. Continuous monitoring of the PDCCH uses more battery power at the UE, and DRX conserves battery power at the UE.

Figures 4A, 4B:
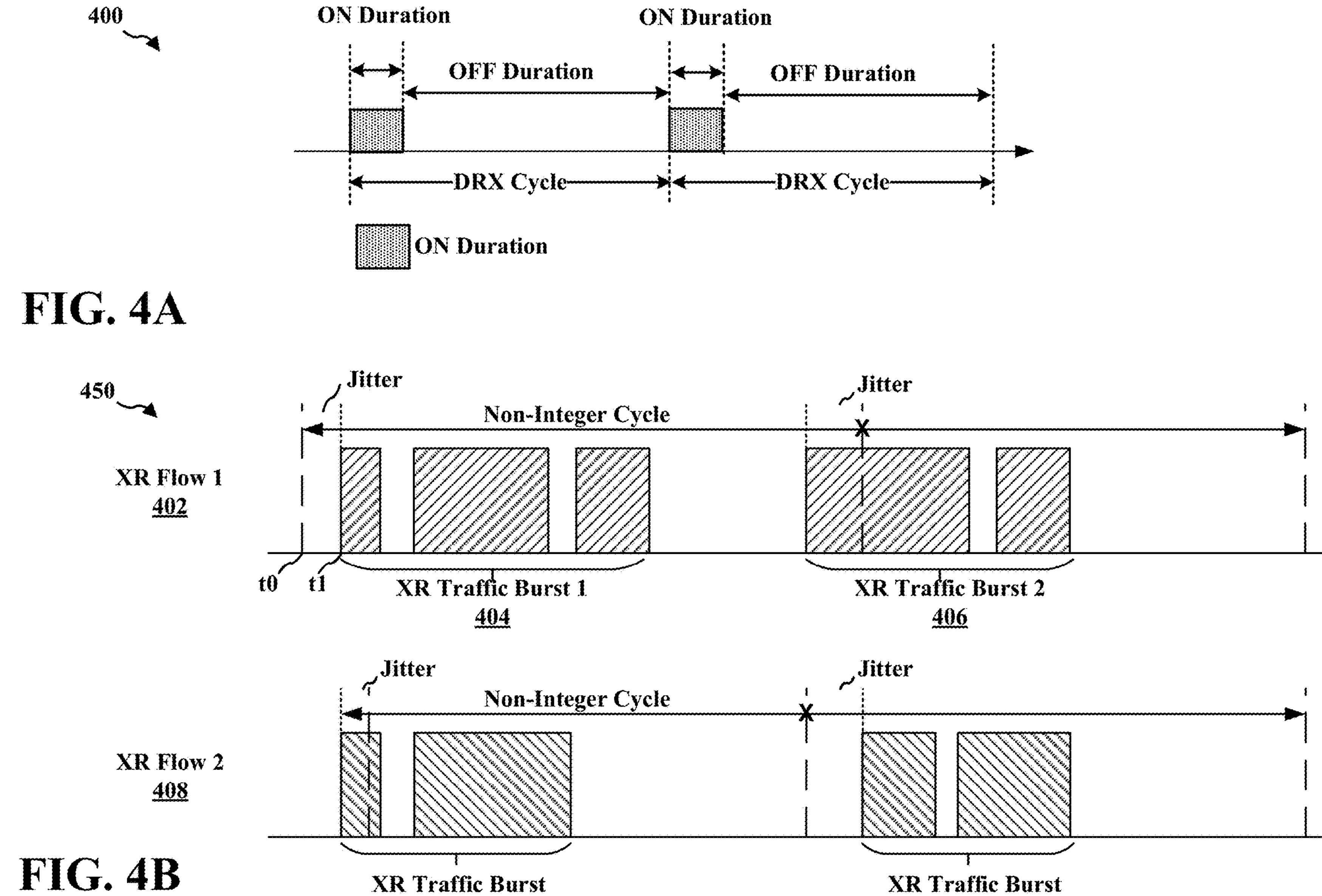
FIG. 4A is a diagram illustrating a discontinuous reception (DRX) cycle in wireless communication.
FIG. 4B is a diagram illustrating example extended reality (XR) traffic, in accordance with various aspects of the present disclosure.

FIG. 4A illustrates an example of a DRX cycle 400, including periodic ON durations during which the UE monitors for PDCCH and OFF durations during which the UE may not monitor for the PDCCH. The OFF duration may be referred to as a DRX opportunity, in some aspects. During the OFF duration, the UE does not monitor for PDCCH. The UE may enter a sleep mode or a low-power mode in which the UE minimizes power consumption by shutting down an RF function without detecting communication from the base station.

The UE may receive a DRX configuration from the network in RRC signaling from a base station, such as in an RRC Connection Setup request or an RRC connection reconfiguration request. A DRX configuration may include the configuration of one or more timers and values. In some examples, the DRX configuration may include any of an ON duration Timer, a DRX inactivity timer, a DRX retransmission timer, a DRX UL retransmission timer, a long DRX cycle, a value of the DRX start offset, a DRX short cycle timer, and/or a short DRX cycle, among others. The ON duration timer may correspond to a number of consecutive PDCCH subframes to be monitored or decoded when the UE wakes up from the OFF duration in the DRX Cycle. The DRX retransmission timer may correspond to a consecutive number of PDCCH subframes for the UE to monitor when a retransmission is expected by the UE. The DRX inactivity timer may correspond to an amount of time before the UE may again enter the OFF duration following successfully decoding PDCCH. The amount of time may be in terms of a transmission time interval (TTI) duration. After a UE successfully receives downlink data, the DRX Inactivity Timer may start counting a number of subframes. If any uplink or downlink data transmissions occur while the DRX inactivity timer is running, the timer restarts. If the DRX inactivity timer expires without uplink or downlink activity, the UE may enter the DRX cycle to achieve power savings.

Wireless communication may include various types of communication. Among other examples, wireless communication may include XR traffic. FIG. 4B is a diagram 450 illustrating example XR traffic. XR traffic may refer to wireless communications for technologies such as virtual reality (VR), mixed reality (MR), and/or augmented reality (AR). VR may refer to technologies in which a user is immersed in a simulated experience that is similar to or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The diagram 450 illustrates a first XR flow 402 that includes a first XR traffic burst 404 and a second XR traffic burst 406. As illustrated in the diagram 450, the traffic bursts may include different numbers of packets, e.g., the first XR traffic burst 404 being shown with three packets (represented as rectangles in the diagram 450) and the second XR traffic burst 406 being shown with two packets. Furthermore, as illustrated in the diagram 450, the three packets in the first XR traffic burst 404 and the two packets in the second XR traffic burst 406 may vary in size. That is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in 1/60=16.67 ms periods. In another example, for 120 FPS video data, XR traffic bursts may arrive in 1/120=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 450 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

XR traffic may have an associated packet delay budget (PDB). If a packet does not arrive within the PDB, a UE (or a base station) may discard the packet. In an example, if a packet corresponding to a video frame of a video does not arrive at a UE within a PDB, the UE may discard the packet, as the video has advanced beyond the frame.

In general, XR traffic may be characterized by relatively high data rates and low latency. The latency in XR traffic may affect the user experience. For instance, XR traffic may have applications in eMBB and URLLC services.

Some types of wireless communication systems may employ dynamic grants for scheduling purposes to accommodate traffic (e.g., XR traffic). In a dynamic grant, a scheduler may use control signaling to allocate resources for transmission or reception at a UE (e.g., a grant of UL or DL resources). Dynamic grants may be flexible and can adapt to variations in traffic behavior. A UE may monitor for a PDCCH including a DCI that schedules the UE to transmit or receive communication with a base station (e.g., instructions to receive data over a PDSCH). However, monitoring for a PDCCH consumes power at the UE, and can increase latency in communication between the UE and the base station as the UE waits for a resource assignment to transmit or receive communication.

Figure 5:
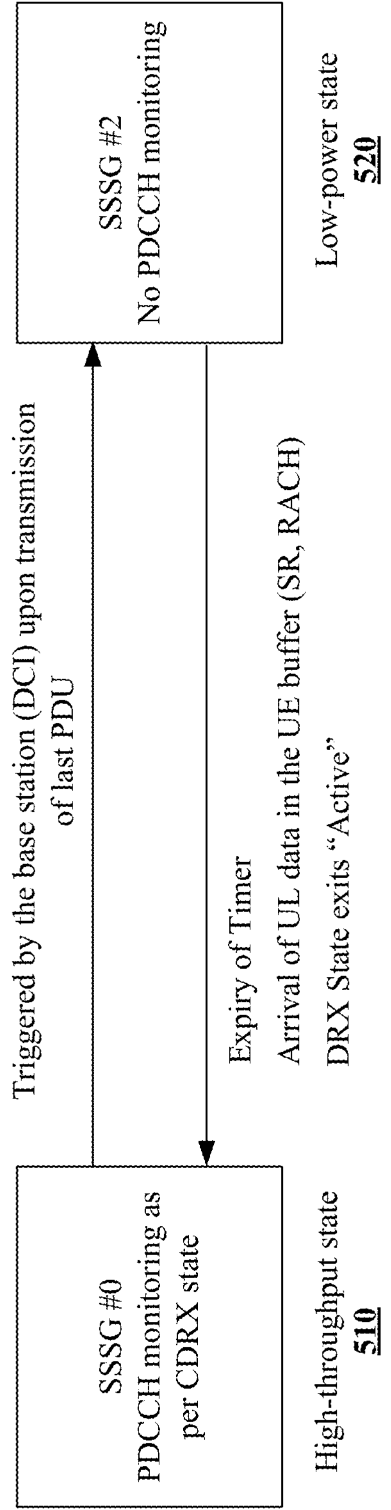
FIG. 5 is a diagram illustrating an example of PDCCH skipping.

Various aspects may be employed to provide power saving and/or capacity improvement for wireless communication, e.g., including XR traffic. In some configurations, the UE may skip monitoring PDCCH for a period of time. The skipping of PDCCH monitoring is a feature that helps to save power at the UE by enabling the UE to skip monitoring for PDCCH during times when the network does not plan to send control signaling to the UE. FIG. 5 is a diagram 500 illustrating an example of PDCCH skipping. As shown in FIG. 5, a UE may operate on a high-throughput state 510 (e.g., search space set group (SSSG) #0), in which the UE may monitor PDCCH as per DRX state (e.g., per CDRX state). Upon receiving a DCI (e.g., a scheduling DCI) that indicates for the UE to skip PDCCH monitoring, the UE may enter a low-power state 520 (e.g., SSSG #2), in which the UE may skip PDCCH monitoring. The specific DCI may usually be transmitted with the last grant of a data burst and may include a field that indicates to the UE that the PDCCH monitoring may be skipped for a period of time. The time may be a configured time (e.g., which may be referred to as a pre-configured time). The PDCCH skipping allows a UE to enter sleep before the expiry of the CDRX inactivity timer, which may reduce the power consumption of the UE. The UE may skip the PDCCH monitoring until the period of time expires or until a condition is met.

Figure 6:
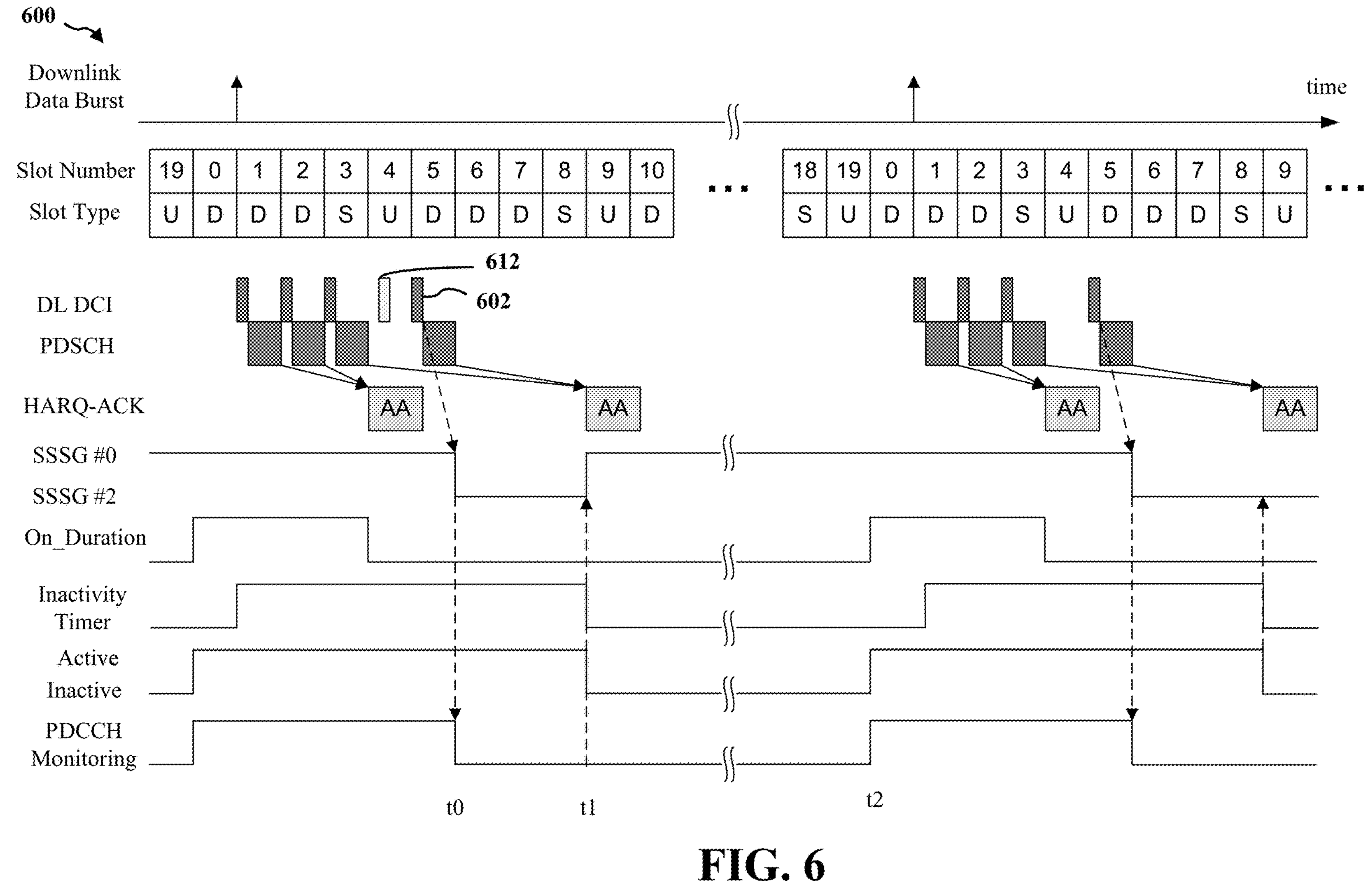
FIG. 6 is a diagram illustrating timing sequences of an example of PDCCH skipping.

FIG. 6 is a diagram 600 illustrating timing sequences of an example of PDCCH skipping. Referring to FIG. 6, the UE may receive a specific DCI 602 (e.g., a scheduling DCI) that indicates the UE to start skipping PDCCH monitoring. Based on the specific DCI 602, the UE may start skipping PDCCH monitoring (e.g., at t0) before the expiration of the CDRX Inactivity Timer (e.g., at t1), and the PDCCH monitoring may be skipped until a pre-configured timer expires or a condition is met. When the UE is configured for CDRX, the condition may be that the DRX state is exiting an "Active" state or active time.

In PDCCH skipping mechanism based on scheduling DCI, the DL grant that is used to indicate the UE to skip PDCCH monitoring (i.e., to send the UE to a lower-power state) is used to schedule data at the same time. Hence, the scheduling DCI has limited flexibility and transmission resource (e.g., information field in the DCI) to indicate the UE to skip PDCCH monitoring.

The present disclosure provides methods and apparatus that utilize dummy grants as non-scheduling DCI for PDCCH monitoring adaptation indication. Compared to the PDCCH monitoring adaptation indication based on scheduling DCI, the non-scheduling DCI may be more flexibly transmitted for the UE to stop further monitoring PDCCH anytime needed. More importantly, the non-scheduling DCI can provide additional field bits originally used for scheduling to indicate a PDCCH skipping duration from a larger set of values (e.g., >3). This could be helpful when the CDRX configuration for the UE is not configured for multiple coexisting traffic flows without a common periodicity. Various combinations or uses of the fields in a DCI format for scheduling resources, in which the DCI does not actually schedule resources, can be used to indicate the PDCCH skipping to the UE.

Using dummy grants as a non-scheduling DCI may achieve a similar effect as a non-scheduling DCI-based PDCCH skipping indication and/or a non-scheduling DCI-based CDRX active time extension. For example, referring to FIG. 6, the non-scheduling DCI 612 may be used as an indication for PDCCH skipping. That is, instead of using the scheduling DCI 602 to indicate PDCCH skipping, the non-scheduling DCI 612 may be used to indicate the UE to skip PDCCH monitoring (e.g., starting from t0) or to extend the CDRX active time. The non-scheduling DCI 612 may be transmitted to the UE at any time, and the non-scheduling DCI 612 does not schedule data. Upon receiving the non-scheduling DCI 612, the UE may skip the transmission of HARQ feedback for the non-scheduling DCI 612. Dummy grants may be used as the non-scheduling DCI 612. The non-scheduling DCI-based mechanism and the dummy grant may be used for XR-specific power saving for a more flexible adaptation of UE CDRX active time to account for the random jitter and variable XR video frame sizes.

In some aspects, non-scheduling DCI may indicate PDCCH skipping or CDRX active time extension, and one or more dummy grants may be used as the non-scheduling DCI. The dummy grant may be used for the purposes of indicating PDCCH skipping or the extension of CDRX active time, and not used for scheduling any PDSCH. When a dummy grant is used to indicate PDCCH skipping or CDRX active time extension, the UE may not be required to transmit HARQ feedback. The dummy grant may include a new data indicator (NDI) field. In some aspects, the NDI filed may not be toggled, the PDCCH monitoring adaptation field of the dummy grant may indicate PDCCH skipping, and the UE may skip PDCCH monitoring immediately. In some other aspects, the NDI field of the dummy grant may be toggled, the PDCCH monitoring adaptation field of the dummy grant may not be expected to indicate PDCCH skipping, and the UE may restart the CDRX inactivity timer.

The dummy grant may be implemented in various ways. In some examples, the dummy grant may be a grant with a skip indication. The skip indication may be, in some examples, an invalid RB allocation. That is, the dummy grant may be an indication that will not be interpreted by the UE as a valid RB allocation. For example, the dummy grant may be an all-0 bitmap for the type-0 resource allocation or an all-1 bitmap for the type-1 resource allocation. In this disclosure, the "type-0" resource allocation may refer to a pre-defined resource allocation scheme in which the all-0 bitmap is not a valid RB allocation, and the "type-1" resource allocation may refer to another pre-defined resource allocation scheme in which the all-1 bitmap is not a valid RB allocation. In some examples, the skip indication may have a first number of adaptation bits in the DCI that is different from a second number of associated PDCCH skip durations. In some examples, the skip indication may include a single adaptation bit in the DCI for multiple (e.g., 2) PDCCH skip durations (which may be defined by the parameter PDCCHSkippingDuration). In some examples, the skip indication may include multiple (e.g., 2) adaptation bits in the DCI for a single PDCCH skip duration (e.g., defined by parameter PDCCHSkippingDuration).

In some examples, the dummy grant may be a retransmission of a successfully decoded PDSCH. When the UE receives such a retransmission, the UE may interpret the retransmission as a dummy grant since the PDSCH has been successfully decoded, and the UE may use the dummy grant for PDCCH skipping indication or CDRX active time extension. In some examples, the base station may send a non-zero DL assignment with a DL retransmission TB size that is different than an initial DL transmission TB size, and the UE may interpret such a DL assignment as a dummy grant. In some examples, the base station may send a non-zero UL assignment with a UL retransmission TB size that is different than an initial UL transmission TB size, and the UE may interpret such a UL assignment as a dummy grant.

Figure 7:
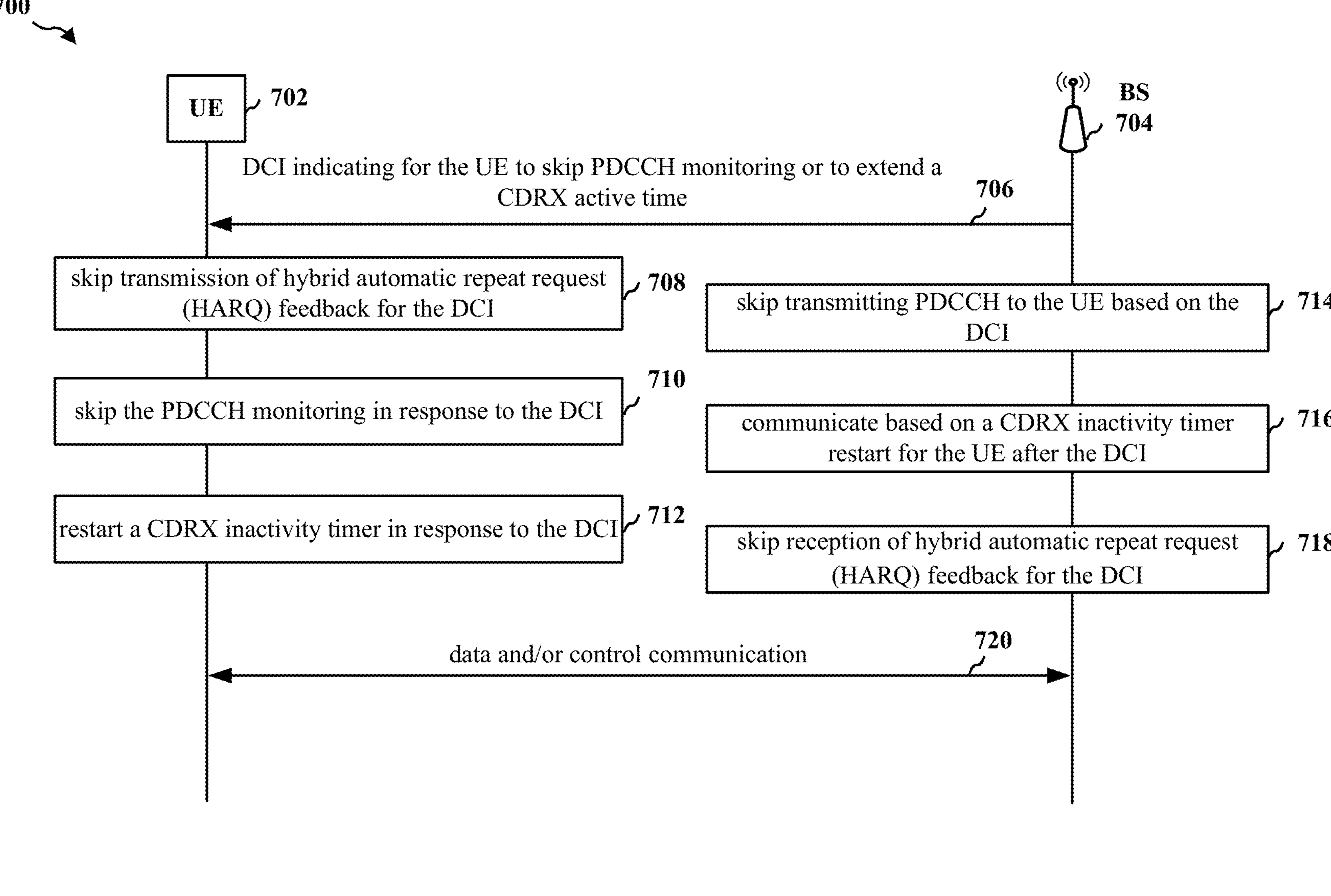
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. In some aspects, the wireless communication may include XR traffic, such as described in connection with FIG. 4B. Although aspects are described for a base station 704, the aspects may be performed by a base station in aggregation and/or by one or more components of a base station 704 (e.g., such as a CU 110, a DU 130, and/or an RU 140).

As shown in FIG. 7, a UE 702 may receive, at 706, DCI indicating for the UE 702 to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. In some examples, the DCI may be a non-scheduling DCI. For example, the DCI may be the non-scheduling DCI 612.

At 708, the UE 702 may skip the transmission of HARQ feedback for the DCI. For example, referring to FIG. 6, when the UE receives the non-scheduling DCI 612, the UE may skip the transmission of HARQ feedback for the non-scheduling DCI 612.

At 710, the UE 702 may skip the PDCCH monitoring in response to the DCI. For example, referring to FIG. 6, after the UE receives the non-scheduling DCI 612, the UE may skip (at t0, for example) the PDCCH monitoring in response to the non-scheduling DCI 612.

At 712, the UE 702 may restart a DRX inactivity timer (e.g., such as a CDRX inactivity timer) in response to the DCI. For example, referring to FIG. 6, in some aspects, after the UE receives the non-scheduling DCI 612, the UE may restart the CDRX inactivity timer in response to the non-scheduling DCI 612.

At 714, the base station 704 may skip transmitting PDCCH to the UE 702 based on the DCI. For example, referring to FIG. 6, after the base station transmits the non-scheduling DCI 612 to the UE, the base station may skip transmitting PDCCH to the UE based on the non-scheduling DCI 612.

At 716, the base station 704 may communicate with the UE based on a CDRX inactivity timer restarted for the UE 702 after the DCI. For example, referring to FIG. 6, after the UE receives the non-scheduling DCI 612, the UE may restart the CDRX inactivity timer in response to the non-scheduling DCI 612, and the base station and the UE may communicate based on the restarted CDRX inactivity timer.

At 718, the base station 704 may skip the reception of HARQ feedback for the DCI. For example, referring to FIG. 6, after the base station transmits the non-scheduling DCI

612 to the UE, the base station may skip the reception of HARQ feedback for the non-scheduling DCI 612.

At 720, the base station 704 may communicate data and/or control with the UE 702 based on the DCI. For example, referring to FIG. 6, after the base station transmits the non-scheduling DCI 612 to the UE, the base station may communicate with the UE based on the non-scheduling DCI 612.

Figure 8:
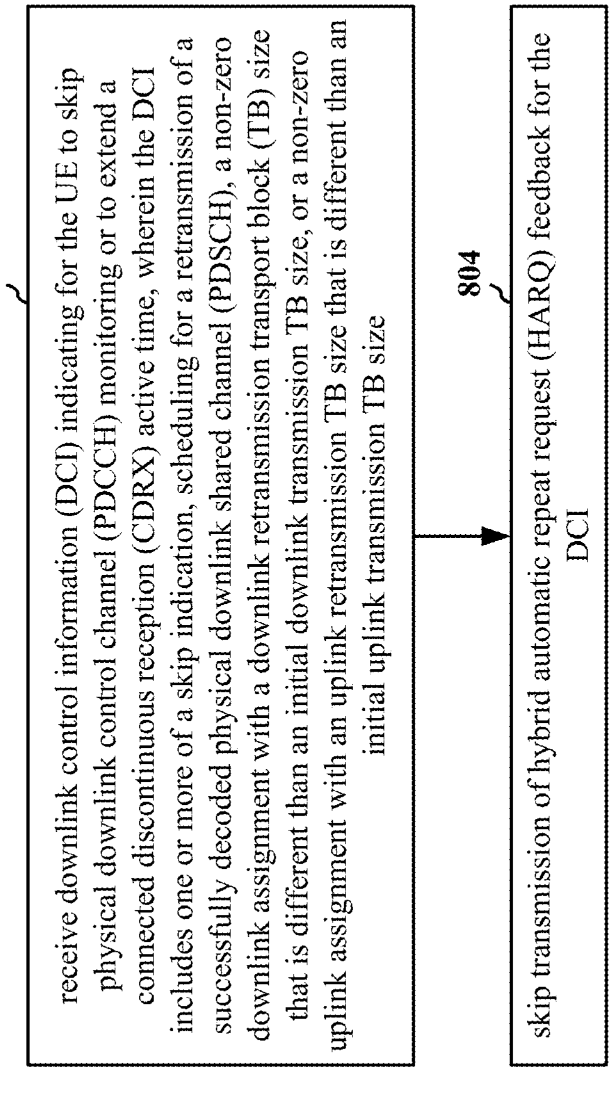
FIG. 8 is the first flowchart illustrating methods of wireless communication at a UE in accordance with various aspects of the present disclosure.

FIG. 8 is a flowchart 800 illustrating methods of wireless communication at a UE in accordance with various aspects of the present disclosure. In some aspects, the wireless communication may include XR traffic, such as described in connection with FIG. 4B. The method may be performed by a UE. The UE may be the UE 104, 350, 702, or the apparatus 1204 in the hardware implementation of FIG. 12. By utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

As shown in FIG. 8, at 802, the UE may receive, from a network entity, DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The network entity may be a base station, or a component of a base station, in the access network of FIG. 1 or a core network component (e.g., base station 102, 310; base station 704; or the network entity 1202 in the hardware implementation of FIG. 12). FIGS. 6 and 7 illustrate various aspects of the steps in connection with flowchart 800. For example, referring to FIGS. 6 and 7, the UE 702 may receive, at 706, from a network entity (base station 704), DCI 612. The DCI 612 may indicate the UE 702 to skip PDCCH monitoring or to extend a CDRX active time. The DCI 612 may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. In some aspects, 802 may be performed by the DCI reception component 198.

At 804, the UE may skip the transmission of HARQ feedback for the DCI. For example, referring to FIG. 7, the UE 702 may, at 708, skip the transmission of HARQ feedback for the DCI. Referring to FIG. 6, after the UE receives the DCI 612, the UE may skip the transmission of HARQ feedback (AA) for the DCI 612. In some aspects, 804 may be performed by the DCI reception component 198.

Figure 9:
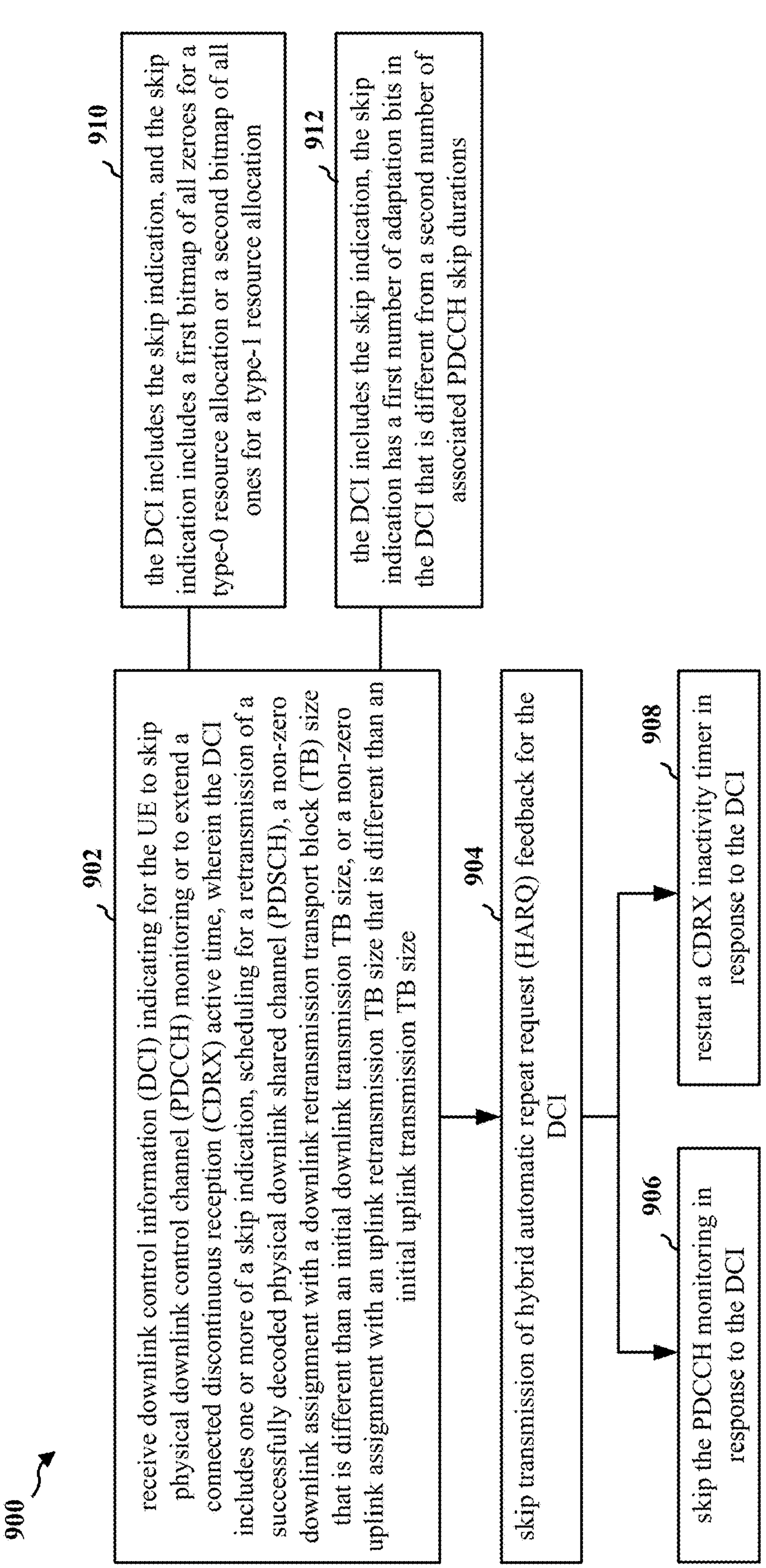
FIG. 9 is the first flowchart illustrating methods of wireless communication at a UE in accordance with various aspects of the present disclosure.

FIG. 9 is a flowchart 900 illustrating methods of wireless communication at a UE in accordance with various aspects of the present disclosure. In some aspects, the wireless communication may include XR traffic, such as described in connection with FIG. 4B. The method may be performed by a UE. The UE may be the UE 104, 350, 702, or the apparatus 1204 in the hardware implementation of FIG. 12. By utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

As shown in FIG. 9, at 902, the UE may receive, from a network entity, DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The network entity may be a base station, or a component of a base station, in the access network of FIG. 1 or a core network component (e.g., base station 102, 310; base station 704; or the network entity 1202 in the hardware implementation of FIG. 12). FIGS. 6 and 7 illustrate various aspects of the steps in connection with flowchart 900. For example, referring to FIGS. 6 and 7, the UE 702 may receive, at 706, from a network entity (base station 704), DCI 612. The DCI 612 may indicate the UE 702 to skip PDCCH monitoring or to extend a CDRX active time. The DCI 612 may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. In some aspects, 902 may be performed by the DCI reception component 198.

At 904, the UE may skip the transmission of HARQ feedback for the DCI. For example, referring to FIG. 7, the UE 702 may, at 708, skip the transmission of HARQ feedback for the DCI. Referring to FIG. 6, after the UE receives the DCI 612, the UE may skip the transmission of HARQ feedback (AA) for the DCI 612. In some aspects, 904 may be performed by the DCI reception component 198.

In some aspects, the DCI may include the scheduling for the retransmission of the successfully decoded PDSCH. For example, referring to FIG. 6, the DCI 612 may include the scheduling for the retransmission of the successfully decoded PDSCH.

In some aspects, at 910, the DCI may include a skip indication. The skip indication may include one or more of: a first bitmap of all zeroes for a type-0 resource allocation, or a second bitmap of all ones for a type-1 resource allocation. For example, referring to FIG. 6, the DCI 612 may include a skip indication. The skip indication may include one or more of: a first bitmap of all zeroes for a type-0 resource allocation, or a second bitmap of all ones for a type-1 resource allocation.

In some aspects, at 912, the DCI may include the skip indication. The skip indication may have a first number of adaptation bits in the DCI that is different from a second number of associated PDCCH skip durations. For example, referring to FIG. 6, the DCI 612 may include a skip indication. The skip indication may have a first number of adaptation bits in the DCI 612 that is different from a second number of associated PDCCH skip durations.

In some aspects, the skip duration may include a single adaptation bit in the DCI for multiple PDCCH skip durations. For example, referring to FIG. 6, the DCI 612 may include a skip indication. The skip indication may include a single adaptation bit in the DCI 612 for multiple (e.g., 2) PDCCH skip durations.

In some aspects, the skip duration may include multiple adaptation bits in the DCI for a single PDCCH skip duration. For example, referring to FIG. 6, the DCI 612 may include a skip indication. The skip duration may include multiple (e.g., 2) adaptation bits in the DCI 612 for a single PDCCH skip duration.

In some aspects, the DCI may include the non-zero downlink assignment with the downlink retransmission TB size that is different than the initial downlink transmission TB size. For example, referring to FIG. 6, the DCI 612 may include the non-zero downlink assignment with the downlink retransmission TB size that is different than the initial downlink transmission TB size.

In some aspects, the DCI may include the non-zero uplink assignment having the uplink retransmission TB size that is different than the initial uplink transmission TB size. For example, referring to FIG. 6, the DCI 612 may include the non-zero uplink assignment having the uplink retransmission TB size that is different than the initial uplink transmission TB size.

In some aspects, an entry in the NDI in the DCI may indicate that a PDCCH monitoring adaptation field of the DCI indicates for the UE to skip the PDCCH monitoring for a period of time, and the UE may be further configured to: at 906, skip the PDCCH monitoring in response to the DCI. For example, referring to FIG. 6, an entry in the NDI in the DCI 612 may indicate that a PDCCH monitoring adaptation field of the DCI indicates for the UE to skip the PDCCH monitoring for a period of time (e.g., from t0 to t2), and the UE may be further configured to: skip the PDCCH monitoring in response to the DCI 612. Referring to FIG. 7, after the UE 702 receives the DCI at 706, the UE 702 may skip the PDCCH monitoring in response to the DCI at 710. In some aspects, 906 may be performed by the DCI reception component 198.

In some aspects, an entry in the NDI in the DCI may indicate that a PDCCH monitoring adaptation field of the DCI does not include PDCCH skipping information, and the UE may be further configured to: at 908, restart a CDRX inactivity timer in response to the DCI. For example, referring to FIG. 6, an entry in the NDI in the DCI 612 may indicate that a PDCCH monitoring adaptation field of the DCI 612 does not include PDCCH skipping information, and the UE may be further configured to: restart a CDRX inactivity timer in response to the DCI 612. Referring to FIG. 7, after the UE 702 receives the DCI at 706, the UE 702 may restart a CDRX inactivity timer in response to the DCI at 712. In some aspects, 908 may be performed by the DCI reception component 198.

Figure 10:
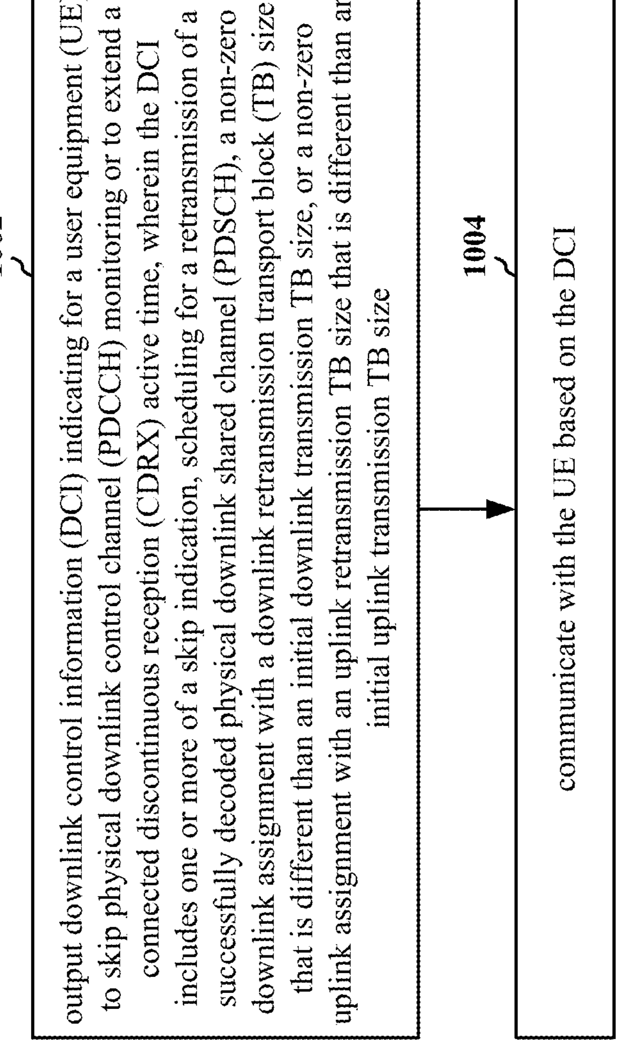
FIG. 10 is the first flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. In some aspects, the wireless communication may include XR traffic, such as described in connection with FIG. 4B. The network entity may be a base station, or a component of a base station, in the access network of FIG. 1 or a core network component (e.g., base station 102, 310, 704; or the network entity 1202 in the hardware implementation of FIG. 12). By utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

As shown in FIG. 10, at 1002, the network entity may output, to a UE, DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The UE may be the UE 104, 350, 702, or the apparatus 1204 in the hardware implementation of FIG. 12. FIGS. 6 and 7 illustrate various aspects of the steps in connection with flowchart 1000. For example, referring to FIGS. 6 and 7, the network entity (base station 704) may output, at 706, to a UE 702, DCI 612. The DCI 612 may indicate the UE to skip PDCCH monitoring or to extend a CDRX active time. The DCI 612 may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. In some aspects, 1002 may be performed by the DCI indication component 199.

At 1004, the network entity may communicate with the UE based on the DCI. For example, referring to FIGS. 6 and 7, the network entity (base station 704) may communicate, at 720, with the UE 702 based on the DCI 612. In some aspects, 1004 may be performed by the DCI indication component 199.

Figure 11:
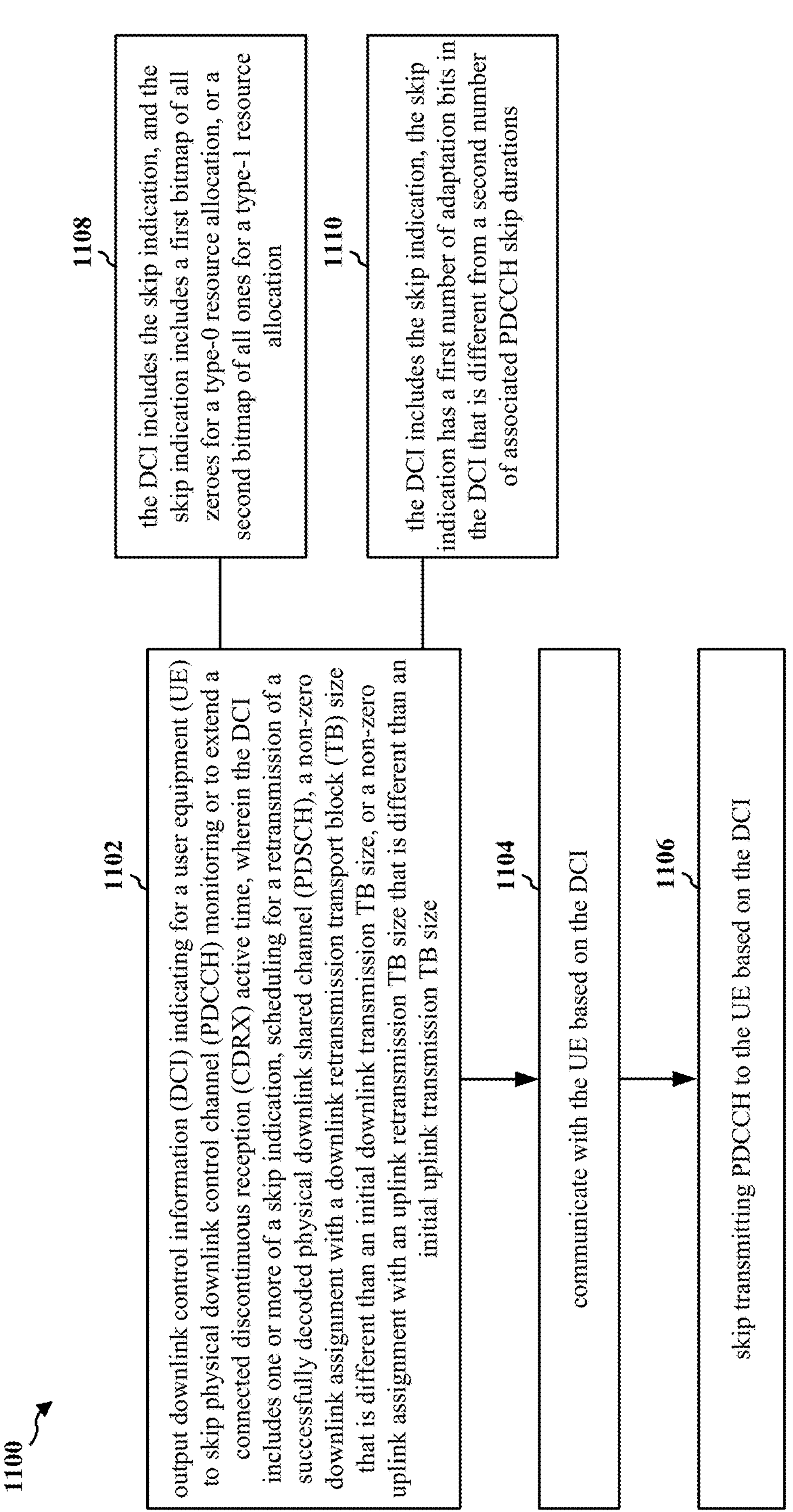
FIG. 11 is the first flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. In some aspects, the wireless communication may include XR traffic, such as described in connection with FIG. 4B. The network entity may be a base station, or a component of a base station, in the access network of FIG. 1 or a core network component (e.g., base station 102, 310, 704; or the network entity 1202 in the hardware implementation of FIG. 12). By utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

As shown in FIG. 11, at 1102, the network entity may output, to a UE, DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The UE may be the UE 104, 350, 702, or the apparatus 1204 in the hardware implementation of FIG. 12. FIGS. 6 and 7 illustrate various aspects of the steps in connection with flowchart 1000. For example, referring to FIGS. 6 and 7, the network entity (base station 704) may output, at 706, to a UE 702, DCI 612. The DCI 612 may indicate the UE to skip PDCCH monitoring or to extend a CDRX active time. The DCI 612 may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. In some aspects, 1102 may be performed by the DCI indication component 199.

At 1104, the network entity may communicate with the UE based on the DCI. For example, referring to FIGS. 6 and 7, the network entity (base station 704) may communicate, at 720, with the UE 702 based on the DCI 612. In some aspects, 1104 may be performed by the DCI indication component 199.

In some aspects, the DCI may include the scheduling for the retransmission of the successfully decoded PDSCH. For example, referring to FIG. 6, the DCI 612 may include the scheduling for the retransmission of the successfully decoded PDSCH.

In some aspects, at 1108, the DCI may include a skip indication, and the skip indication may include one or more of: a first bitmap of all zeroes for a type-0 resource allocation, or a second bitmap of all ones for a type-1 resource allocation. For example, referring to FIG. 6, the DCI 612 may include a skip indication. The skip indication may include one or more of: a first bitmap of all zeroes for a type-0 resource allocation, or a second bitmap of all ones for a type-1 resource allocation.

In some aspects, at 1110, the DCI may include the skip indication, the skip indication may have a first number of adaptation bits, and the first number may be different from a second number of associated PDCCH skip durations.

In some aspects, the skip indication may include a single adaptation bit in the DCI for multiple PDCCH skip durations. For example, referring to FIG. 6, the DCI 612 may include a skip indication. The skip indication may include a single adaptation bit in the DCI 612 for multiple PDCCH skip durations.

In some aspects, the skip indication may include multiple adaptation bits in the DCI for a single PDCCH skip duration. For example, referring to FIG. 6, the DCI 612 may include a skip indication. The skip indication may include multiple adaptation bits in the DCI 612 for a single PDCCH skip duration.

In some aspects, the DCI may include the non-zero downlink assignment with the downlink retransmission TB size that is different than the initial downlink transmission TB size. For example, referring to FIG. 6, the DCI 612 may include the non-zero downlink assignment with the downlink retransmission TB size that is different than the initial downlink transmission TB size.

In some aspects, the DCI may include the non-zero uplink assignment having the uplink retransmission TB size that is different than the initial uplink transmission TB size. For example, referring to FIG. 6, the DCI 612 may include the non-zero uplink assignment having the uplink retransmission TB size that is different than the initial uplink transmission TB size.

In some aspects, wherein an entry in the NDI in the DCI may indicate that a PDCCH monitoring adaptation field of the DCI indicates for the UE to skip the PDCCH monitoring for a period of time, and the network entity may be further configured to: at 1106, skip transmitting PDCCH to the UE based on the DCI. For example, referring to FIG. 6, an entry in the NDI in the DCI 612 may indicate that a PDCCH monitoring adaptation field of the DCI 612 indicates for the UE to skip the PDCCH monitoring for a period of time (e.g., from t0 to t2), and the network entity may be further configured to: skip transmitting PDCCH to the UE based on the DCI 612. Referring to FIG. 7, after the network entity (base station 704) transmits, at 706, the DCI to the UE 702, the network entity (base station 704) may, at 714, skip transmitting PDCCH to the UE 702 based on the DCI. In some aspects, 1106 may be performed by the DCI indication component 199.

In some aspects, an entry in the NDI in the DCI may indicate that a PDCCH monitoring adaptation field of the DCI does not include PDCCH skipping information, and, to communicate with the UE, the network entity may be configured to: communicate based on a CDRX inactivity timer restarted for the UE after the DCI. For example, referring to FIG. 6, an entry in the NDI in the DCI 612 may indicate that a PDCCH monitoring adaptation field of the DCI does not include PDCCH skipping information, and the network entity may be configured to communicate based on a CDRX inactivity timer restarted for the UE after the DCI 612.

In some aspects, to communicate with the UE, the network entity may be configured to: skip the reception of HARQ feedback for the DCI. For example, referring to FIG. 6, to communicate with the UE, the network entity may be configured to skip the reception of HARQ feedback (AA) for the DCI 612. Referring to FIG. 7, to communicate with the UE 702, the network entity (base station 704) may, at 718, skip the reception of HARQ feedback for the DCI.

Figure 12:
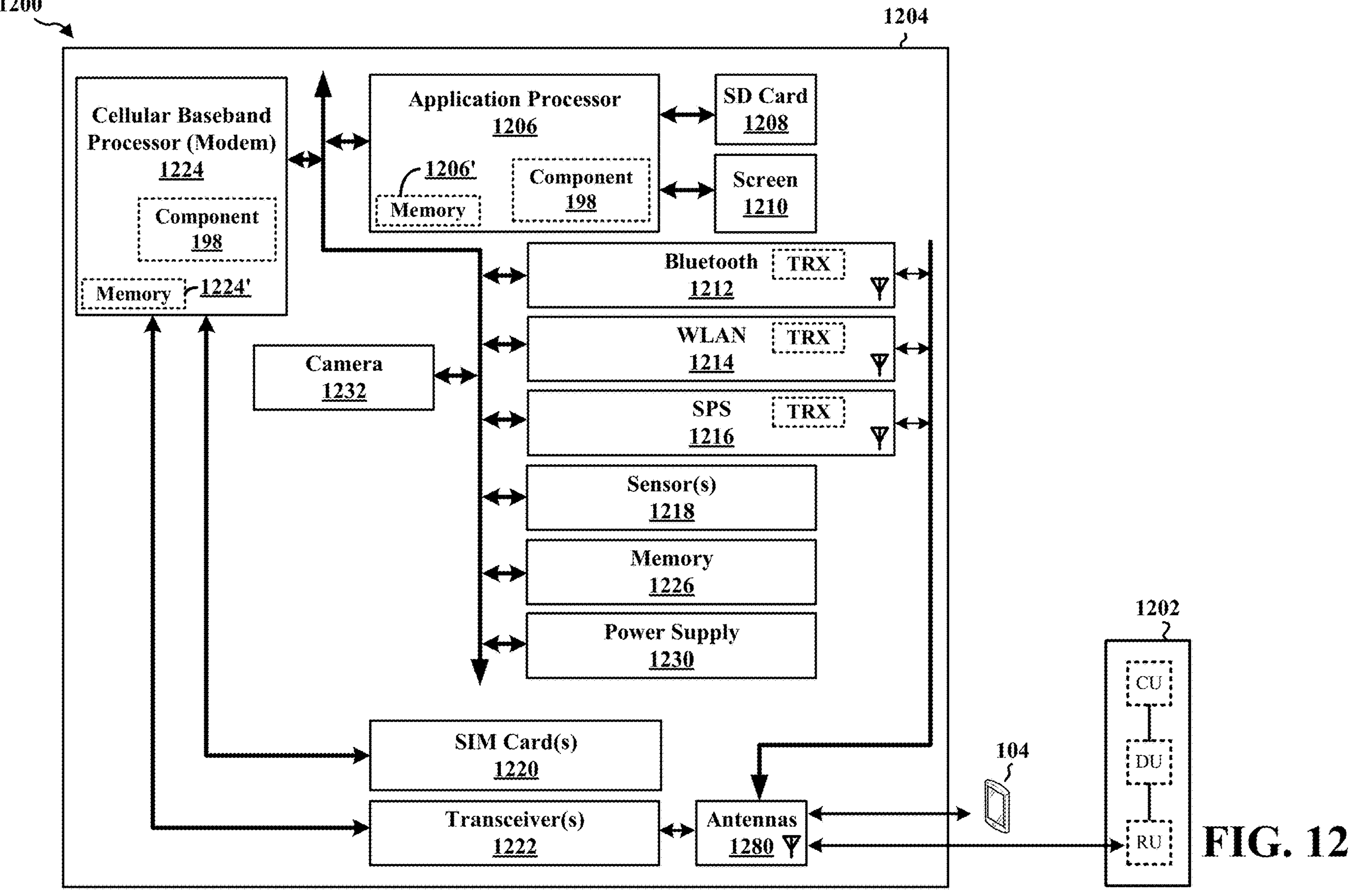
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The cellular baseband processor(s) 1224 and the application processor(s) 1206 are configured to perform the various functions described supra based at least in part of the information stored in the memory. That is, the cellular baseband processor(s) 1224 and the application processor(s) 1206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the component 198 may be configured to receive DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The component 198 may be further configured to skip the transmission of HARQ feedback for the DCI. The component 198 may be further configured to perform any of the aspects described in connection with flowcharts 800 and 900 in FIG. 8 and FIG. 9, and/or performed by the UE 702 in FIG. 7. The component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for receiving DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The apparatus 1204 may further include means for skipping transmission of HARQ feedback for the DCI. The apparatus 1204 may further include means for performing any of the aspects described in connection with flowcharts 800 and 900 in FIG. 8 and FIG. 9, and/or aspects performed by the UE 702 in FIG. 7. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
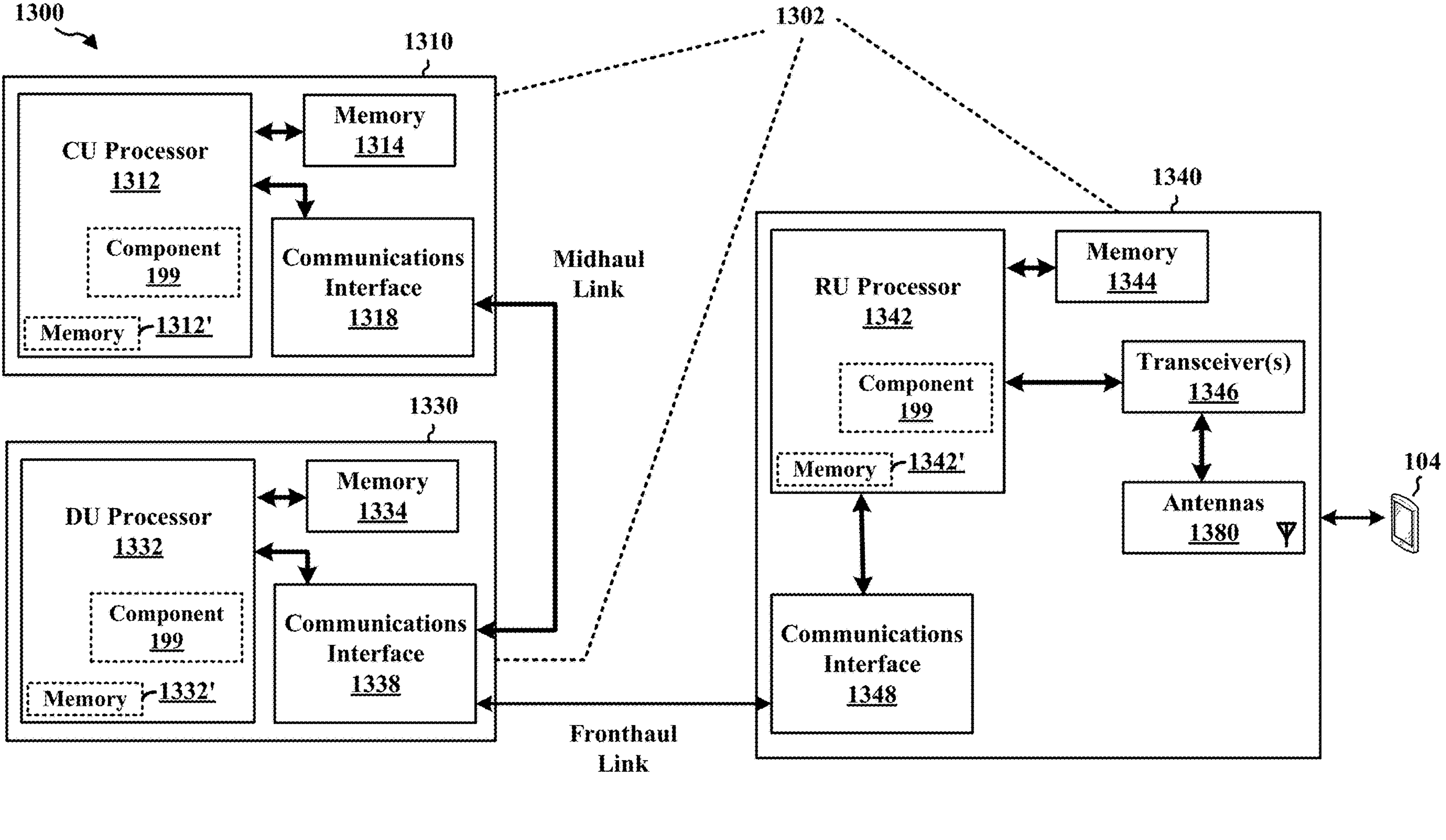
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to output DCI indicating for a UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The component 199 may be further configured to communicate with the UE based on the DCI. The component 199 may be further configured to perform any of the aspects described in connection with flowcharts 1000 and 1100 in FIG. 10 and FIG. 11, and/or performed by the base station 704 in FIG. 7. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for outputting DCI indicating for a UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The network entity 1302 may further include means for communicating with the UE based on the DCI. The network entity 1302 may further include means for performing any of the aspects described in connection with flowcharts 1000 and 1100 in FIG. 10 and FIG. 11, and/or aspects performed by the base station 704 in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving DCI indicating for the UE to skip PDCCH monitoring or to extend a CDRX active time, wherein the DCI includes one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size; and skipping transmission of HARQ feedback for the DCI. By utilizing dummy grants as non-scheduling DCI for PDCCH monitoring adaptation, the method enables more flexible indications with additional information fields for PDCCH monitoring compared to the indication mechanisms based on scheduling DCI. Hence, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include receiving DCI indicating for the UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The method may further include skipping transmission of hybrid automatic repeat request (HARQ) feedback for the DCI.

Aspect 2 is the method of aspect 1, where the DCI may include the scheduling for the retransmission of the successfully decoded PDSCH.

Aspect 3 is the method of aspect 1, where the DCI may include the skip indication, which may include one or more of: a first bitmap of all zeroes for a type-0 resource allocation, or a second bitmap of all ones for a type-1 resource allocation.

Aspect 4 is the method of aspect 1, where the DCI may include the skip indication, the skip indication may have a first number of adaptation bits in the DCI that is different from a second number of associated PDCCH skip durations.

Aspect 5 is the method of aspect 4, where the skip indication may include a single adaptation bit in the DCI for multiple PDCCH skip durations.

Aspect 6 is the method of aspect 4, where the skip indication may include multiple adaptation bits in the DCI for a single PDCCH skip duration.

Aspect 7 is the method of aspect 1, where the DCI may include the non-zero downlink assignment with the downlink retransmission TB size that is different than the initial downlink transmission TB size.

Aspect 8 is the method of aspect 1, where the DCI may include the non-zero uplink assignment having the uplink retransmission TB size that is different than the initial uplink transmission TB size.

Aspect 9 is the method of any of aspects 1 to 8, where the entry in the NDI in the DCI may indicate that a PDCCH monitoring adaptation field of the DCI indicates for the UE to skip the PDCCH monitoring for a period of time, and the method may further include: skipping the PDCCH monitoring in response to the DCI.

Aspect 10 is the method of any of aspects 1 to 8, where the entry in the NDI in the DCI may indicate that a PDCCH monitoring adaptation field of the DCI does not include PDCCH skipping information, and the method may further include: restarting a CDRX inactivity timer in response to the DCI.

Aspect 11 is an apparatus for wireless communication at a UE, including: at least one memory; and at least one processor coupled to the at least one memory and, based at least in part on information stored in the at least one memory, the at least one processor, individually or in any combination, is configured to perform the method of any of aspects 1-10.

Aspect 12 is the apparatus for wireless communication at a UE, comprising means for performing each step in the method of any of aspects 1-10.

Aspect 13 is an apparatus of any of aspects 11 to 12, further comprising a transceiver configured to receive or to transmit in association with the method of any of aspects 1-10.

Aspect 14 is a computer-readable medium (e.g., a non-transitory computer-readable medium) storing computer executable code at a UE, where the code when executed by at least one processor causes the at least one processor to, individually or in any combination, perform the method of any of aspects 1-10.

Aspect 15 is a method of wireless communication at a network entity. The method may include: outputting DCI indicating for a UE to skip PDCCH monitoring or to extend a CDRX active time. The DCI may include one or more of a skip indication, scheduling for a retransmission of a successfully decoded PDSCH, a non-zero downlink assignment with a downlink retransmission TB size that is different than an initial downlink transmission TB size, or a non-zero uplink assignment with an uplink retransmission TB size that is different than an initial uplink transmission TB size. The method may further include communicating with the UE based on the DCI.

Aspect 16 is the method of aspect 15, where the DCI may include the scheduling for the retransmission of the successfully decoded PDSCH.

Aspect 17 is the method of aspect 15, where the DCI may include the skip indication, and the skip indication may include one or more of: a first bitmap of all zeroes for a type-0 resource allocation, or a second bitmap of all ones for a type-1 resource allocation.

Aspect 18 is the method of aspect 15, where the DCI may include the skip indication, the skip indication may have a first number of adaptation bits in the DCI that is different from a second number of associated PDCCH skip durations.

Aspect 19 is the method of aspect 18, where the skip indication may include a single adaptation bit in the DCI for multiple PDCCH skip durations.

Aspect 20 is the method of aspect 18, where the skip indication may include multiple adaptation bits in the DCI for a single PDCCH skip duration.

Aspect 21 is the method of aspect 15, where the DCI may include the non-zero downlink assignment with the downlink retransmission TB size that is different than the initial downlink transmission TB size.

Aspect 22 is the method of aspect 15, where the DCI may include the non-zero uplink assignment having the uplink retransmission TB size that is different than the initial uplink transmission TB size.

Aspect 23 is the method of any of aspects 15 to 22, where the entry in the NDI in the DCI may indicate that a PDCCH monitoring adaptation field of the DCI indicates for the UE to skip the PDCCH monitoring for a period of time, and the method may further include: skipping transmitting PDCCH to the UE based on the DCI.

Aspect 24 is the method of any of aspects 15 to 22, where the entry in the NDI in the DCI may indicate that a PDCCH monitoring adaptation field of the DCI does not include PDCCH skipping information, and communicating with the UE may include: communicating based on a CDRX inactivity timer restarted for the UE after the DCI.

Aspect 25 is the method of aspect 15 to 24, where communicating with the UE may include: skipping reception of HARQ feedback for the DCI.

Aspect 26 is an apparatus for wireless communication at a network entity, including: at least one memory; and at least one processor coupled to the at least one memory and, based at least in part on information stored in the at least one memory, the at least one processor, individually or in any combination, is configured to perform the method of any of aspects 15-25.

Aspect 27 is the apparatus for wireless communication at a network entity, comprising means for performing each step in the method of any of aspects 15-25.

Aspect 28 is an apparatus of any of aspects 26-27, further comprising a transceiver configured to receive or to transmit in association with the method of any of aspects 15-25.

Aspect 29 is a computer-readable medium (e.g., a non-transitory computer-readable medium) storing computer executable code at a network entity, where the code when executed by at least one processor causes the at least one processor, individually or in any combination, to perform the method of any of aspects 15-25.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to cause the UE to:
receive downlink control information (DCI) indicating for the UE to skip physical downlink control channel (PDCCH) monitoring or to extend a connected discontinuous reception (CDRX) active time, wherein the DCI includes a dummy grant, wherein the dummy grant is implemented as one or more of: a grant with a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size; and
skip transmission of hybrid automatic repeat request (HARQ) feedback for the DCI based on an interpretation of the DCI as the dummy grant.

2. The apparatus of claim 1, further comprising a transceiver coupled to the at least one processor, wherein, to receive the DCI, the at least one processor, individually or in any combination, is configured to cause the UE to receive the DCI via the transceiver.

3. The apparatus of claim 1, wherein the DCI includes the scheduling for the retransmission of the successfully decoded PDSCH.

4. The apparatus of claim 1, wherein the DCI includes the skip indication, and the skip indication comprises one or more of:
a first bitmap of all zeroes for a type-0 resource allocation, or
a second bitmap of all ones for a type-1 resource allocation.

5. The apparatus of claim 1, wherein the DCI includes the skip indication, the skip indication has a first number of adaptation bits in the DCI that is different from a second number of associated PDCCH skip durations.

6. The apparatus of claim 5, wherein the skip indication includes a single adaptation bit in the DCI for multiple PDCCH skip durations.

7. The apparatus of claim 5, wherein the skip indication includes multiple adaptation bits in the DCI for a single PDCCH skip duration.

8. The apparatus of claim 1, wherein the DCI includes the non-zero downlink assignment with the downlink retransmission TB size that is different than the initial downlink transmission TB size.

9. The apparatus of claim 1, wherein the DCI includes the non-zero uplink assignment having the uplink retransmission TB size that is different than the initial uplink transmission TB size.

10. The apparatus of claim 1, wherein an entry in a new data indicator (NDI) in the DCI indicates that a PDCCH monitoring adaptation field of the DCI indicates for the UE to skip the PDCCH monitoring for a period of time, and the at least one processor, individually or in any combination, is further configured to cause the UE to:
skip the PDCCH monitoring in response to the DCI.

11. The apparatus of claim 1, wherein an entry in a new data indicator (NDI) in the DCI indicates that a PDCCH monitoring adaptation field of the DCI does not include PDCCH skipping information, and the at least one processor, individually or in any combination, is further configured to cause the UE to:
restart a CDRX inactivity timer in response to the DCI.

12. An apparatus for wireless communication at a network entity, comprising:
at least one memory; and
at least one processor coupled to the at least one memory and, based at least in part on information stored in the at least one memory, the at least one processor, individually or in any combination, is configured to cause the network entity to:
output downlink control information (DCI) indicating for a user equipment (UE) to skip physical downlink control channel (PDCCH) monitoring or to extend a connected discontinuous reception (CDRX) active time, wherein the DCI includes a dummy grant, wherein the dummy grant is implemented as one or more of: a grant with a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size; and
skip reception of hybrid automatic repeat request (HARQ) feedback for the DCI based on the DCI comprising the dummy grant.

13. The apparatus of claim 12, further comprising a transceiver coupled to the at least one processor, wherein, to output the DCI, the at least one processor, individually or in any combination, is configured to cause the network entity to output the DCI via the transceiver.

14. The apparatus of claim 12, wherein the DCI includes the scheduling for the retransmission of the successfully decoded PDSCH.

15. The apparatus of claim 12, wherein the DCI includes the skip indication, and the skip indication comprises one or more of:
a first bitmap of all zeroes for a type-0 resource allocation, or
a second bitmap of all ones for a type-1 resource allocation.

16. The apparatus of claim 12, wherein the DCI includes the skip indication, the skip indication has a first number of adaptation bits in the DCI that is different from a second number of associated PDCCH skip durations.

17. The apparatus of claim 16, wherein the skip indication includes a single adaptation bit in the DCI for multiple PDCCH skip durations.

18. The apparatus of claim 16, wherein the skip indication includes multiple adaptation bits in the DCI for a single PDCCH skip duration.

19. The apparatus of claim 12, wherein the DCI includes the non-zero downlink assignment with the downlink retransmission TB size that is different than the initial downlink transmission TB size.

20. The apparatus of claim 12, wherein the DCI includes the non-zero uplink assignment having the uplink retransmission TB size that is different than the initial uplink transmission TB size.

21. The apparatus of claim 12, wherein an entry in a new data indicator (NDI) in the DCI indicates that a PDCCH monitoring adaptation field of the DCI indicates for the UE to skip the PDCCH monitoring for a period of time, and the at least one processor, individually or in any combination, is further configured to cause the network entity to:

skip transmitting PDCCH to the UE based on the DCI.

22. The apparatus of claim 12, wherein an entry in a new data indicator (NDI) in the DCI indicates that a PDCCH monitoring adaptation field of the DCI does not include PDCCH skipping information, wherein, to communicate with the UE, the at least one processor, individually or in any combination, is configured to cause the network entity to:

communicate based on a CDRX inactivity timer restarted for the UE after the DCI.

23. A method of wireless communication at a user equipment (UE), comprising:

receiving downlink control information (DCI) indicating for the UE to skip physical downlink control channel (PDCCH) monitoring or to extend a connected discontinuous reception (CDRX) active time, wherein the DCI includes a dummy grant, wherein the dummy grant is implemented as one or more of: a grant with a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size; and skipping transmission of hybrid automatic repeat request (HARQ) feedback for the DCI based on an interpretation of the DCI as the dummy grant.

24. The method of claim 23, wherein the DCI includes the scheduling for the retransmission of the successfully decoded PDSCH.

25. The method of claim 23, wherein the DCI includes the skip indication, and the skip indication comprises one or more of:

a first bitmap of all zeroes for a type-0 resource allocation, or a second bitmap of all ones for a type-1 resource allocation.

26. The method of claim 23, wherein the DCI includes the skip indication, and the skip indication has a first number of adaptation bits in the DCI that is different from a second number of associated PDCCH skip durations.

27. The method of claim 26, wherein the skip indication includes a single adaptation bit in the DCI for multiple PDCCH skip durations.

28. The method of claim 26, wherein the skip indication includes multiple adaptation bits in the DCI for a single PDCCH skip duration.

29. A method of wireless communication at a network entity, comprising:

outputting downlink control information (DCI) indicating for a user equipment (UE) to skip physical downlink control channel (PDCCH) monitoring or to extend a connected discontinuous reception (CDRX) active time, wherein the DCI includes a dummy grant, wherein the dummy grant is implemented as one or more of: a grant with a skip indication, scheduling for a retransmission of a successfully decoded physical downlink shared channel (PDSCH), a non-zero downlink assignment with a downlink retransmission transport block (TB) size that is different than an initial downlink transmission TB size, or a non-zero uplink assignment with an uplink retransmission TB size that is different than an initial uplink transmission TB size; and skip reception of hybrid automatic repeat request (HARQ) feedback for the DCI based on the DCI comprising the dummy grant.

* * * * *